Sept. 28, 1926.
W. G. TRAUTMAN
1,601,696
ROTARY CUTTING DEVICE
Filed Oct. 18, 1923
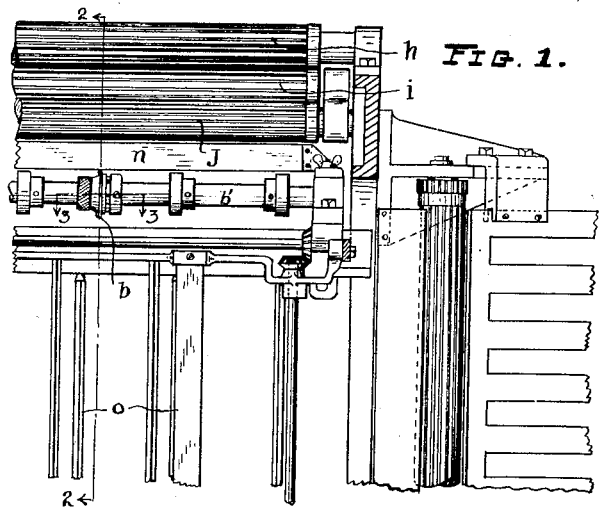
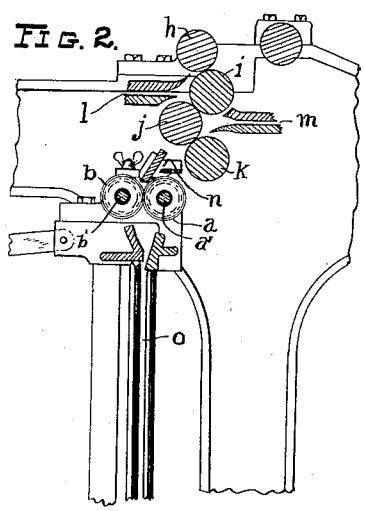
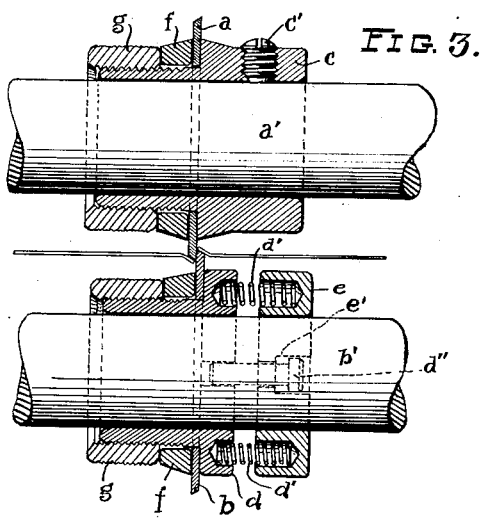
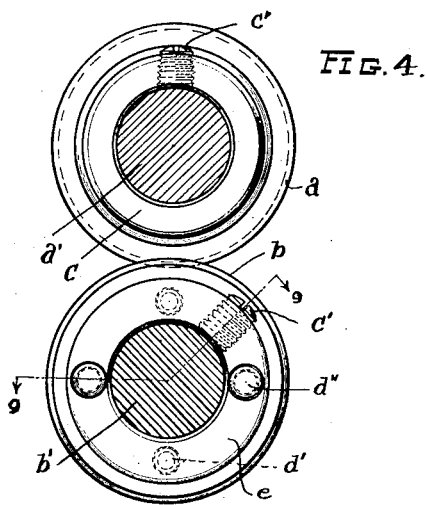
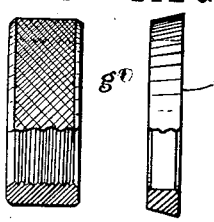
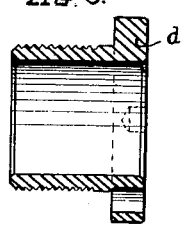
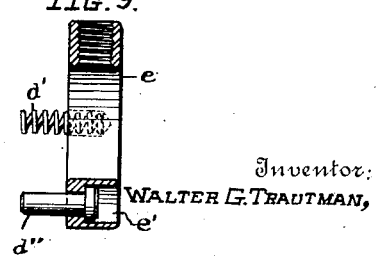
Inventor:
WALTER G. TRAUTMAN,
Attorney.

Patented Sept. 28, 1926.

1,601,696

UNITED STATES PATENT OFFICE.

WALTER G. TRAUTMAN, OF CLEVELAND, OHIO, ASSIGNOR TO THE CLEVELAND FOLDING MACHINE COMPANY, OF CLEVELAND, OHIO, A CORPORATION OF OHIO.

ROTARY CUTTING DEVICE.

Application filed October 18, 1923. Serial No. 669,265.

My invention relates to improvements in rotary cutting devices and more particularly to one adapted for cutting or trimming sheets of paper; the object of said invention being the provision of a flexibly mounted rotary blade adapted to conform to its co-acting blade despite slight irregularities in their respective mountings, while affording a positive drive and attachment for the flexibly mounted cutter.

When paired co-acting rotary cutters of ordinary type are employed for trimming or cutting paper, it is frequently found that their shearing contact is impaired throughout a portion of their peripheries by reason of slight inaccuracies in their mountings or driving shafts. Accordingly, I have devised means for correcting this defect in operation, while improving the operativeness of my novel device.

In the rotary cutting device of my invention one of the rotary blades may be rigidly secured upon its driving shaft, while the opposing blade is provided with a suitable spring mounting and a positive driving connection, although otherwise free, within certain limits, with respect to its driving shaft. The details of my improved device and its manner of use may best be explained by making reference to the accompanying drawings, wherein:—

Figure 1 is a fragmentary view in elevation, partially sectioned, illustrating sufficient of the mechanism of a paper-folding machine for orienting the employment of my present improvements.

Fig. 2 is a vertical section on line 2—2, Fig. 1,

Fig. 3 is an enlarged view in transverse section illustrating the rotary cutting device of my invention, taken on line 3—3, Fig. 1, Fig. 4 is a similar enlarged view of the rotary cutting device, but shown in side elevation, and Figs. 5, 6, 7, 8 and 9 are views principally in vertical cross section showing the details of the flexible mounting for the blade; the section of Fig. 9, however, being on the angular line 9—9, Fig. 4.

Throughout the several figures of the drawings I have employed the same character of reference to indicate similar members or parts.

Referring first to Figs. 3 and 4, it will be seen that two rotary cutting blades $a$ and $b$ are operatively mounted upon their parallel shafts $a'$, $b'$, respectively; the former being rigidly held in any adjusted position by means of the set screw $c'$ within the adjustable collar $c$. Further details of mounting are similar to those of the opposing blade, except for its flexibility, and need not be specifically detailed.

The several parts or members of the flexibly mounted cutter or blade $b$ are well shown in disassembled relation in the latter figures of the drawings; these comprising the adjustable driving collar $e$, its co-acting flexible collar $d$ connected thereto by the springs $d'$ and the limiting drive-pins $d''$ forced within the openings $e'$ of the flexible collar $e$. Said blade $b$ is held rigidly on the flexible collar by means of the reinforcing ring $f$ and knurled thumb nut $g$ screwed over the threaded extremity of said flexible collar. The driving collar $e$ is held in its adjusted position upon the shaft $b'$ so as to tension the springs $d'$ and force the edge of the cutter $b$ against its co-acting cutter $a$ in operative relation, as best shown in Fig. 3.

The preferred employment of my improved device may be explained in connection with Figs. 1 and 2 illustrating the set of folding and buckling rolls $h$, $i$, $j$, and $k$ associated with the throats of their co-acting folding plates $l$ and $m$, rearwardly broken away. From the rolls $j$, $k$, the signature is deflected by the guide $n$ to pass between the rotary cutters $a$, $b$ respectively mounted in opposing relation upon their driving shafts immediately above the transfer frame $o$. These cutting blades are adjusted along their respective driving shafts to contact with the signatures as they come from the folding rolls $j$, $k$ and cut or trim the same in any desired position prior to their entry within the transfer frame.

It will be appreciated that since the blade $b$ is flexibly mounted upon its driving shaft by means of the coiled springs $d'$, tensioned as desired, said blade will accurately conform to the co-acting rotary blade or cutter $a$ rigidly mounted in opposition thereto. Moreover, the collar $d$ is positively driven by means of the pin $d''$, and the thumb nut may be tightened without flexing the springs or forcing the collars $d$ and $e$ out of alinement, by reason of their connection through the drive pin $d''$.

Having now described the embodiment of my invention and its application to one type of paper-folding machine, I claim as new and desire to secure by Letters Patent, the following:—

1. In combination with a rotary cutter member, a co-acting resiliently mounted rotary cutter device, peripherally engaging the former, comprising a driving shaft, a collar and threaded sleeve loosely mounted upon said shaft, an annular cutter blade and a securing nut mounted upon the threaded sleeve, a second opposing collar secured to rotate with the driving shaft, and alternating spacing springs and drive-pins resiliently connecting the first named collar with the latter for rotation with the driving shaft, substantially as set forth.

2. A rotary cutting device or slitting mechanism for paper, comprising a collar adapted to be adjustably secured upon its driving shaft, a second collar facing the other and loosely mounted upon the driving shaft, a rotary blade rigidly mounted thereon; and means for connecting the collars resiliently for actuation by the driving shaft, comprising a loosely fitted drive pin and opposing springs flexibly uniting said collars, substantially as set forth.

3. In combination with an independently rotated cutter, an associated resiliently mounted cutter device peripherally engaging the former, comprising a collar, means for adjustably securing it to its driving shaft, a flexibly mounted collar upon said driving shaft in opposition to the first named collar, a rotary blade thereon, and means operatively connecting said collars, comprising a coupling drive-pin loosely fitted with respect to one of said collars and springs interposed between said collars, substantially as set forth.

In testimony whereof I do now affix my signature.

WALTER G. TRAUTMAN.